(No Model.)
R. K. DOE.
PICTURE EXHIBITOR.
No. 507,529. Patented Oct. 31, 1893.
FIG. I. 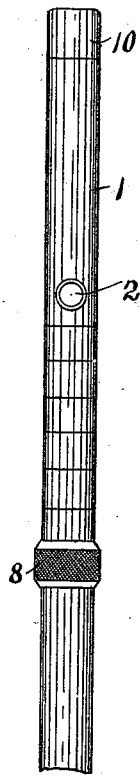
FIG. II. 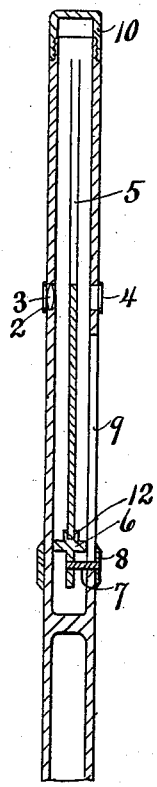
FIG. III. 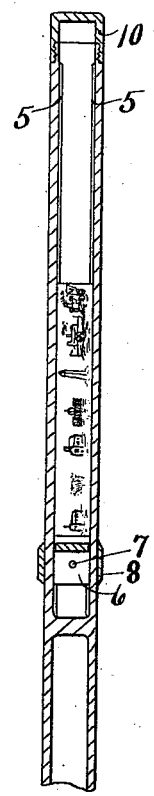
FIG. IV. 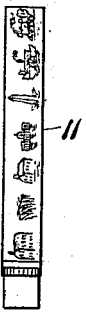
FIG. V. 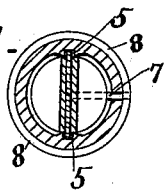
FIG. VI. 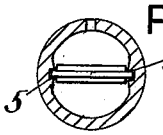
WITNESSES.
Walter E. Allen
Alx Scott
INVENTOR.
Rasmus K. Doe.
BY Knight Bro.
ATTORNEYS

UNITED STATES PATENT OFFICE.

RASMUS K. DOE, OF DULUTH, MINNESOTA.

PICTURE-EXHIBITOR.

SPECIFICATION forming part of Letters Patent No. 507,529, dated October 31, 1893.

Application filed December 16, 1892. Serial No. 455,391. (No model.)

*To all whom it may concern:*

Be it known that I, RASMUS K. DOE, a citizen of the United States, residing at Duluth, in the county of St. Louis and State of Minnesota, have invented certain new and useful Improvements in Picture-Exhibitors, of which the following is a specification.

My invention relates to those devices which have mounted in a suitable holder a picture upon a transparent or translucent material, with a magnifying lens in proper relation on one side of the picture and a light transmitting aperture in the holder on the opposite side of the picture and my invention consists in a certain arrangement of a suitable series of pictures to be brought successively in front of the lens and suitable mechanism for controlling the movement of such pictures, as will be hereinafter fully described and particularly pointed out in the claims.

In the accompanying drawings:—Figure I is a front elevation of a device embodying my invention which is especially designed for use as a handle for some well known object of common use, such as a fan, penholder or other object for which it is adapted. Fig. II is a vertical section through the same in a plane at right angles to the plane of Fig. I. Fig. III is also a vertical section but is taken in a plane parallel to the plane of Fig. I and at right angles to the plane of Fig. II. Fig. IV is an elevation of a column of pictures to be movably mounted in the holder shown in Figs. I, II, and III, said pictures being mounted upon a traverser which is adapted to be connected to a movable collar on the outside of a holder for the purpose of controlling the movement of said column of pictures. Figs. V and VI are transverse sections on an enlarged scale, taken respectively through the collar Fig. II and just below the collar in Fig. III.

The holder consists of a straight cylinder 1 of small diameter provided with exposure opening 2 in which is mounted a lens 3 and light transmitting aperture 4 diametrically opposite to the opening 2. Formed in the sides of the cylinder 1 and in a plane at right angles to the plane of the openings 2 and 4 are channels 5, while within said cylinder and engaging in said channels 5 is a traverser 6. This traverser is connected by a horizontal arm 7 with a collar 8 which slides on the outside of the cylinder 1, said arm 7 being passed through the slot 9 which extends a limited distance in the side of said cylinder, just sufficient to permit a movement of the traverser far enough to bring either end of the column of pictures opposite the exposure opening.

10 represents a screw cap on the upper end of the cylinder which is removable for the purpose of introducing the parts within the cylinder. This cap will also afford convenient means for gaining access to the interior of the cylinder in case it should be desired to change the strip containing the column of pictures. The column of pictures 11 may be of any suitable material preferably of proper width to engage in the slots 5 and thus maintain its position in moving up and down and it is connected with the traverser in any suitable way either permanently or detachably. If it is to be secured detachably the traverser may be provided with a socket 12 into which the strip 11 tightly fits and into which it will be guided by being forced down in the grooves or guides 5.

The parts being constructed and arranged as above described it will be understood that the strip may be moved up or down and any picture brought before the exposure opening to be observed through the magnifying glass or lens by the aid of the light which enters the aperture 4. It is to be understood as stated that the material of the strip 11 is to have the quality of permitting the transmission of light through it. The pictures upon said strip may be applied by any suitable process, photography for instance, the same being considerably reduced from large or accurate views.

On the outside the holder may be provided with a series of cores or lines equal in number and distance apart to the pictures upon the plate within. It will be understood that the sleeve 8 always bears a fixed relation to the strip 11, and it will therefore be understood that when said sleeve and the scores or lines are made to register, a picture will be brought into the proper relation to the apertures 2 and 4 for the purpose of being observed through the magnifying glass.

While I have shown a sliding sleeve for controlling the movement of the pictures, I do not limit myself to the use of such, for other attachments will suggest themselves for controlling the movement of the pictures.

Having thus described my invention, the following is what I claim as new therein and desire to secure by Letters Patent:

1. In a picture exhibitor, the combination of a suitable holder, having exposure and light transmitting apertures in its opposite sides, a flat rigid translucent plate conforming to the shape of the holder containing a series of pictures and movable between said apertures, a carrier to which the picture plate is attached and which has an extension on the outside of the holder, by which the movement of the plate is controlled, and scores or indicating marks on the holder and the plate-controlling projection, to indicate when they are in the proper relative positions, substantially as and for the purposes herein set forth.

2. In a picture exhibitor, the combination of a cylindrical holder, having the exposure and light transmitting apertures at diametrically opposite points in its cylindrical wall, a flat rigid plate or strip conforming to the longitudinal section of the holder, containing a column of figures, and mounted to move backward and forward longitudinally within the holder, between said apertures, and a projection on the outside of the holder in connection with said picture strip for the purpose of controlling the movement thereof, substantially as herein set forth.

3. In a picture exhibitor, the combination of the cylindrical holder having the exposure and light transmitting apertures, the sliding follower fitted to move longitudinally in said cylinder, the translucent strip containing a column of pictures attached to said follower and thereby adapted to be reciprocated longitudinally between the said apertures, an attachment on the outside of the said holder and in connection with the follower, all substantially as herein set forth.

4. In a picture exhibitor, the combination of the cylindrical or tubular holder having the exposure and light transmitting apertures, the pair of longitudinal grooves or guides on the inner wall of the holder and in a plane at right angles to the plane of the apertures, the follower mounted to slide in said grooves or guides, a strip of translucent material containing a column of pictures connected with said follower and also adapted to slide in said grooves or guides, a collar mounted on the outside of said holder, and a connection between the follower within and the collar without; said holder having a longitudinal slot through which said connection passes and which permits of vertical movement of the follower by the collar, all substantially as and for the purpose herein set forth.

RASMUS K. DOE.

Witnesses:
HERVEY S. KNIGHT,
WALTER E. ALLEN.